May 1, 1962   R. C. WELCH   3,031,878
OSCILLATORY APPARATUS
Filed Jan. 23, 1959   3 Sheets-Sheet 1
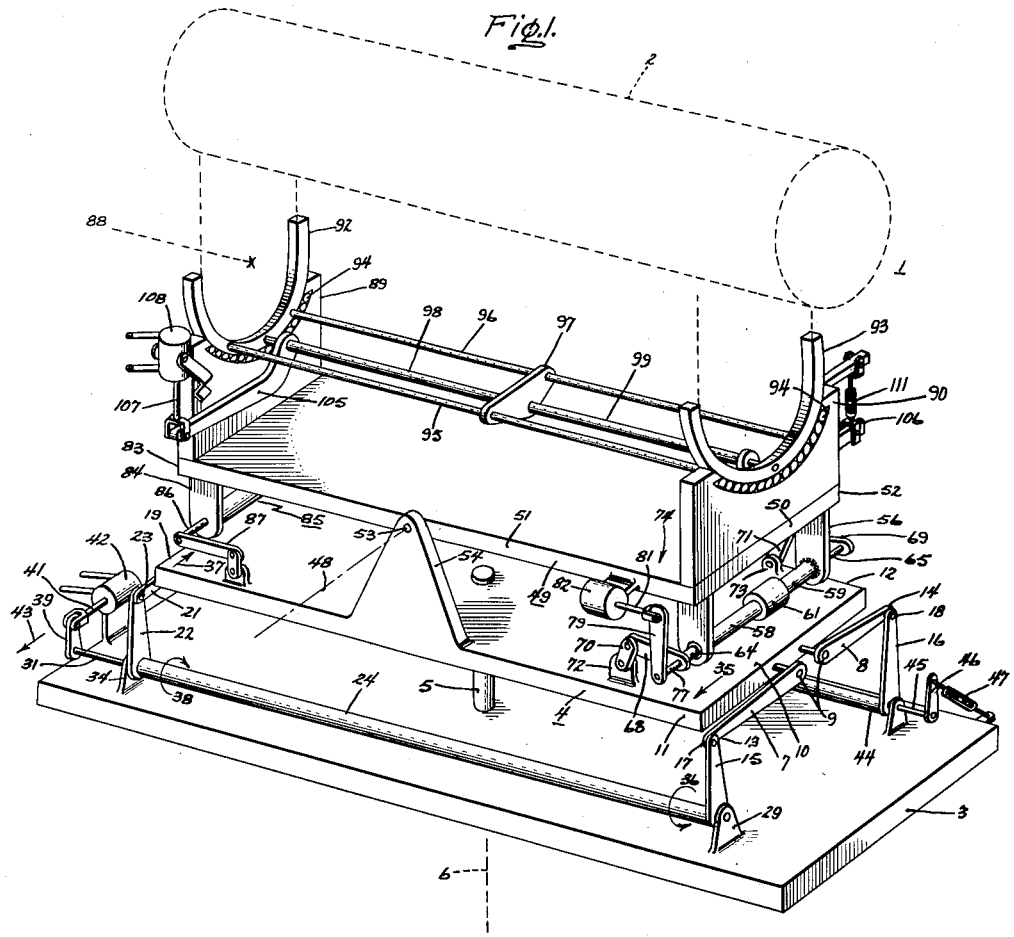
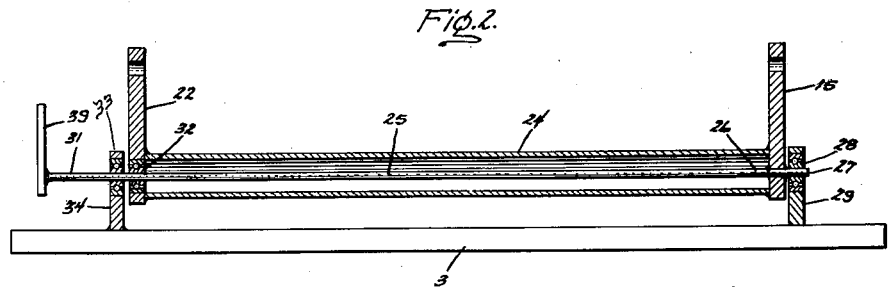
Inventor:
Ralph C. Welch,
by Lust + Irish
Attorneys.

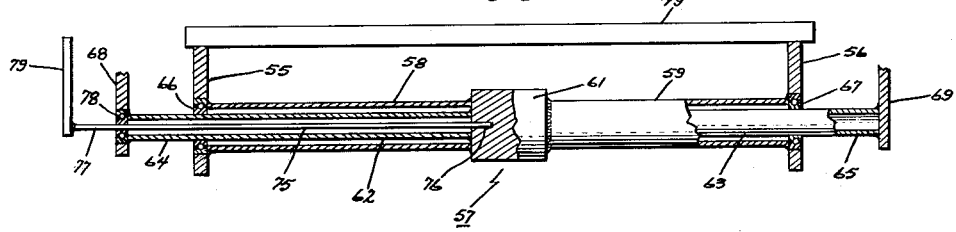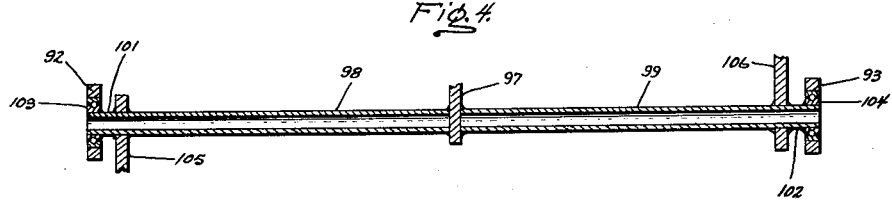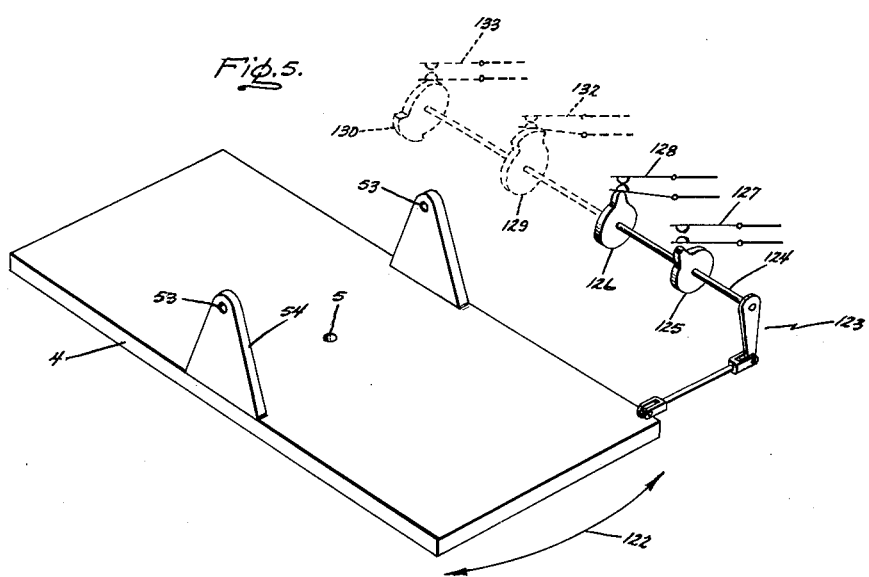

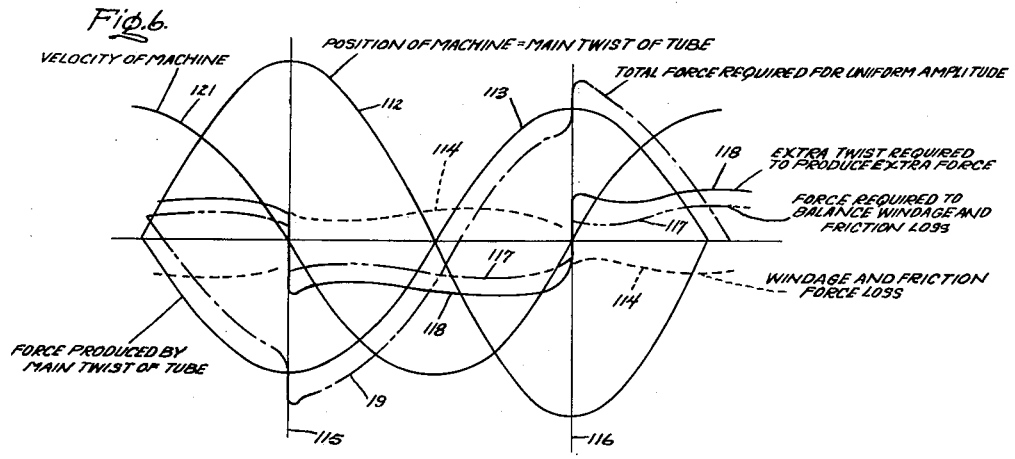
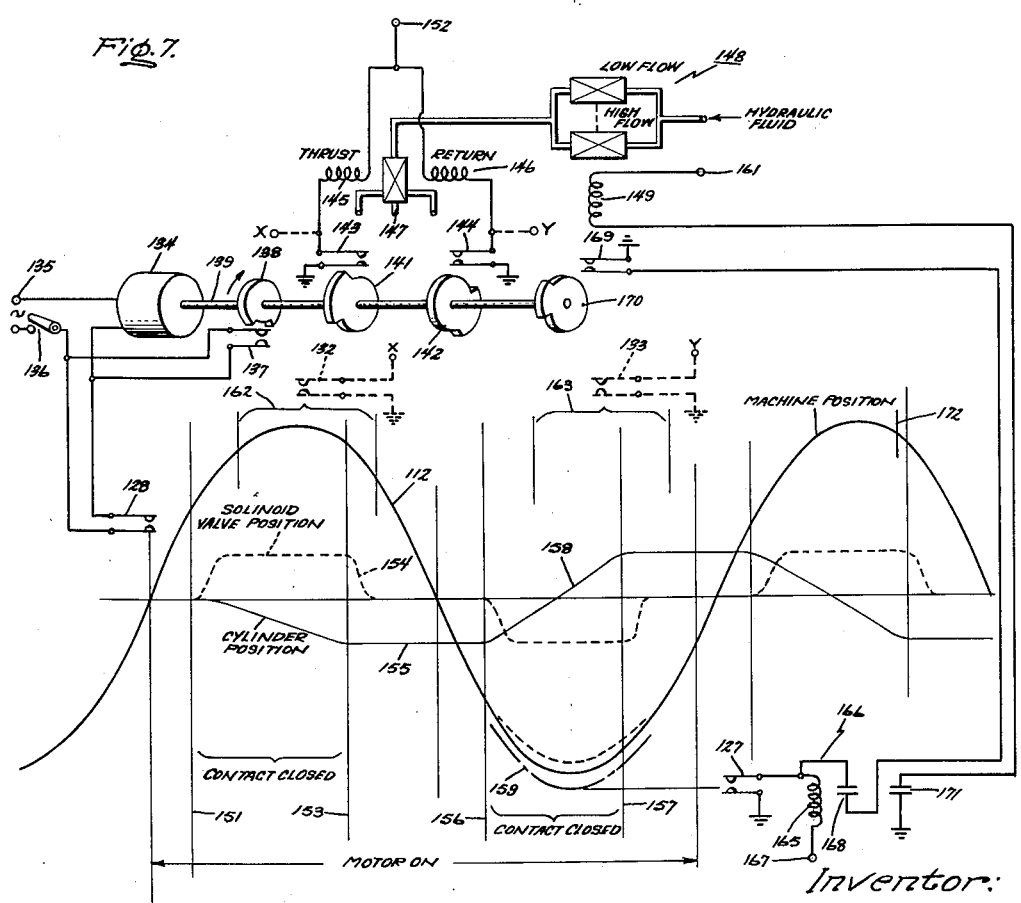

United States Patent Office 3,031,878
Patented May 1, 1962

3,031,878
OSCILLATORY APPARATUS
Ralph C. Welch, Fort Wayne, Ind., assignor to International Telephone and Telegraph Corporation
Filed Jan. 23, 1959, Ser. No. 788,667
22 Claims. (Cl. 73—1)

This invention relates generally to apparatus for imparting oscillatory physical motion to an obect and finds particular utility in apparatus for exercising a pilotless aircraft or missile.

In the testing of pilotless aircraft and missiles, it is desirable to impart motion to the craft which simulates the ways in which it may change its flight attitude in actual air-borne motion. Any craft in space may have motions around three axes which are mutually perpendicular to each other, i.e., commonly referred to as "roll," "pitch" and "yaw"; these three angular positions cover every type of change from straight line flight which the aircraft or missile can encounter. It is therefore desirable to impart these motions to a missile so that accelerometers and rate gyros in the missile which sense and respond to the suddenness of these changes can be tested. Furthermore, in certain aircraft or missiles, there may be devices which are servo-stabilized against such angular movements and thus simulation of these movements permits testing of the stability of such devices.

It is quite obvious that if a pilotless aircraft or missile of any size were to be moved continuously in any one direction, a great deal of space and apparatus requiring substantial power input would be required. For instance, if it were desired to impose a nose-downward pitch to a missile for the several seconds duration which might be required to obtain stable instrument readings, either the missile would have to move so slowly that no significant readings would be obtained, or the missile would have to be turned several times end over end. If such end over end motion were to be speeded up sufficiently and long enough to measure acceleration, obviously very high speeds would have to be reached, in turn requiring a gigantic machine and a correspondingly enormous work space.

It is thus apparent that in order to impart the desired motions to the missile with apparatus of practical size and in a reasonable space, it is necessary to rock the missile back and forth through oscillatory cycles with the peak effects that occur at the centers and turning points of the cycles being read; with fairly simple and well known electronic circuitry, these peaks can be read quickly and with the same accuracy that would be obtained with ordinary dial and position instruments. It is a further simplification if the oscillations imposed on the misssile around each of the three axes follow a sinusoidal waveform; a sinusoidal wave changes uniformly in speed, position and acceleration with all three of these components having simple mathematical relationships to each other. This results in straightforward design of the circuitry and devices which are used to evaluate the performance of the missile instrumentation and control devices during the exerciser motions.

In order however to impart oscillatory motions to a pilotless aircraft or missile of any appreciable size, particularly the pitch and yaw motions, a massive machine is still required in order to withstand the inertia forces involved, such a machine necessitating very substantial power input; a large fly wheel would ordinarily be required to maintain approximately steady speed in order to provide the requisite sinusoidal motion. It is therefore desirable to provide apparatus for imparting sinusoidal oscillatory motion to a large object, such as a pilotless aircraft or missile, in which minimum bulk, space and power input are required.

In accordance with the broader aspects of my invention therefore, the requisite sinusoidal oscillatory motions are provided by vibrating spring systems. An oscillating spring system in its simplest form involves a weight suspended from a fixed surface by a coiled spring. Visualizing now such a system, it will be recalled that the pull of the spring has a straight line relationship to its length, and as a result, the acceleration of the weight likewise bears a straight line relationship to the distance by which it is moved from its neutral or balanced position. Thus, below such neutral position, the pull of the spring is greater than that of the weight, thus causing the weight to decelerate and "bounce" back, whereas with the weight above the neutral position, the force of the spring is less than the pull of the weight and gravity has a similar effect in decelerating the weight and causing it to drop back. It is a well known principle of physics that when acceleration is directly proportional, i.e., has a straight line relationship, to the distance of a mass from its neutral position, a sinusoidal motion will result, the acceleration of the mass following a sine wave in phase opposition to the position of the mass. Thus, with reference again to the classic oscillatory spring system, when the weight is above its neutral position, the spring force is less than the pull of the weight and vice versa, and therefore, since the net spring force represents the accelerating force, it is also apparent that the direction of the acceleration of the weight is opposite to the position of the weight, as well as being in proportion to the weight position.

Thus, by virtue of the simplicity, compactness, and relative ease of manufacture, in accordance with my invention, I have provided apparatus for imparting sinusoidal oscillating motion to an object utilizing oscillating spring systems to provide each of the three oscillatory motions; in the preferred embodiment of my invention, I employ torsion tubes for the springs. More particularly, I provide three moving tables or cradles, each arranged for oscillatory motion about one of the three axes and each being linked to the adjacent cradle through torsion tube springs.

Returning now to the oscillatory spring and weight system described above, it will readily be recalled that such a system, once placed in motion and absent losses, will oscillate indefinitely at a uniform amplitude. However, through each cycle of oscillation of such a mass-spring system, there is appreciable loss due to friction (heat generated in elongation and contraction of the spring system) and also, in the case of my missile exerciser, which necessarily is of appreciable size, some loss due to windage and other frictional losses in bearings, etc. Thus, in order to build up and sustain oscillation of an oscillatory spring system, it is necessary to introduce additional power to augment the stored energy of the spring system. In accordance with my invention, these additions of power are accomplished by applying appropriate amounts of additional twist to the torsion tube system in the right direction to add to the basic twist which results from the three cradles of the exerciser swinging to their full amplitude.

It is accordingly an object of my invention to provide improved apparatus for imparting oscillatory motion to an object.

Another object of my invention is to provide improved apparatus for imparting oscillatory motion to an object employing an oscillatory spring system with means for adding power to augment the stored energy in the spring, thereby to initiate and sustain oscillation.

A further object of my invention is to provide improved apparatus for imparting oscillatory motion to an object incorporating an oscillatory spring system employing torsion tubes with means for adding twist to the tubes at appropriate times to augment and sustain oscillation.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a view in perspective showing a pilotless aircraft or missile exerciser incorporating my invention;

FIG. 2 is a fragmentary cross-sectional view of the torsion tube spring system of the "yaw" portion of the apparatus of FIG. 1;

FIG. 3 is a fragmentary cross-sectional view illustrating the torsion tube spring system of the "pitch" portion of the apparatus of FIG. 1;

FIG. 4 is a fragmentary cross-sectional view showing the torsion tube spring system of the "roll" portion of the apparatus of FIG. 1;

FIG. 5 is a schematic view illustrating one method of sensing various positions of one of the cradles of FIG. 1 during its oscillatory motion about one of the three axes;

FIG. 6 shows curves useful in explaining the mode of operation of the apparatus of FIG. 1; and FIG. 7 is a schematic diagram illustrating the preferred embodiment of the control for the apparatus of FIG. 1 to provide appropriately timed additions of power to the torsion tube spring system.

Referring now to FIGS. 1 through 4 of the drawing, my improved exerciser apparatus 1, which is particularly suited for imparting roll, pitch and yaw motions to a pilotless aircraft or missile, shown in dashed lines at 2, comprises a fixed base member 3 and a "yaw" table or cradle member 4. Yaw table 4 is pivotally connected to the base 3 in any suitable manner, as at 5, so that the yaw table 4 is free to oscillate about axis 6 vertical to the plane of the base 3, the oscillatory motion of yaw table 4 being in a plane spaced from and parallel to the base 3.

In order to impart the sinusoidal oscillatory motion to yaw table 4 about axis 6, a pair of link members 7 and 8 are provided connected to one end 10 of yaw table 4 adjacent its longitudinal center line by means of suitable ball joints 9. Link members 7 and 8 extend respectively outward toward side edges 11 and 12 of yaw table 4 and have their outer ends 13 and 14 respectively connected to lever members 15 and 16 by other suitable ball joints 17 and 18. Another pair of link members identical to link members 7 and 8 are provided identically connected to the other end 19 of yaw table 4, only one such link member 21 appearing in FIG. 1. The link members at the other end 19 of yaw table 4 are likewise identically connected to other lever members corresponding to lever members 15 and 16 connected to link members 7 and 8, only one such lever member 22 appearing in FIG. 1. Link member 21 is likewise connected to lever member 22 by a suitable ball joint 23, being also connected to cradle member 4 by a suitable ball joint in the manner of the connection of link member 7 thereto. Also, the members at end 19 of cradle member 4 corresponding to members 8 and 16 are similarly connected to cradle member 4 and to each other by suitable ball joints.

Extending between lever members 15 and 22 and rigidly secured thereto in any suitable manner, as by welding, is a torsion tube member 24. As best seen in FIG. 2, disposed within the torsion tube 24 is a torque shaft 25 having its end 26 extending through a suitable opening in lever member 15 and being secured thereto with its extension 27 being journaled in a suitable bearing 28 in bracket member 29 secured to the base member 3. The other end 31 of torque shaft 25 extends out of torsion tube 24, being journaled in a suitable bearing 32 in lever member 22 and also in a suitable bearing 33 in bracket 34, likewise secured to base member 3. It will now be seen that swinging of the cradle member 4 about axis 6 so that its end 19 moves in the direction shown by the arrow 35 results in the end of the torsion tube 24 connected to lever member 15 being rotated in the direction shown by the arrow 36 with end 19 of cradle member 4 simultaneously moving in the opposite direction as shown by the arrow 37 and the other end of the torsion tube 24 connected to lever member 22 likewise rotating in the opposite direction as shown by the arrow 38 thus imparting a twist to the torsion tube 24.

In order to augment the energy stored in the torsion tube 24, a lever member 39 is connected to end 31 of torque shaft 25, lever 39 in turn being actuated by connecting rod 41 of a suitable hydraulic cylinder 42 mounted on the base member 3. It will now be seen that actuation of the hydraulic cylinder 42 in a direction to move its connecting rod 41 in the direction shown by the arrow 43 imparts a twist to the torque shaft 25 which, by virtue of its rigid connection to the end of the torsion tube 24 to which lever member 15 is connected, in turn imparts a torque to that end of the torsion tube 24 in the direction of the arrow 36. Likewise, actuation of hydraulic cylinder 42 in the direction opposite from the arrow 43 will, through torque shaft 25, impart a torque to the end of torsion tube 24 to which lever member 15 is connected in a direction opposite from the arrow 36.

Since it is desirable that a balanced torsion spring system be provided, another torsion tube 44 identical to torsion tube 24 extends between lever member 16 and its counter part (not seen in FIG. 1) at the other end 19 of cradle member 4. Here, however, torque shaft 45 extends out of the end of torsion tube 44 remote from the end of torsion tube 24 from which extension 31 of torque shaft 25 extends. Lever member 46 connected to the extension of torque shaft 45 of torsion tube 44 is adjustably connected to base member 3 by means of a turn buckle 47 which is employed to adjust the center or neutral position of the cradle member 4. It will now be readily seen that since the inner torque shafts 25 and 45 have only a fraction of the stiffness of the main torsion tubes 24 and 44, twisting of the inner torque shaft 31 a considerable amount by means of hydraulic cylinder 42 results in the application of actuating force to the yaw table 4 in addition to the main force developed by the oscillatory twisting of the main torsion tubes 24 and 44. As will be hereinafter more fully described, this additional twist added to that of the torsion tube 24 is timed so as to augment the energy stored in the torsion tubes 24 and 44 initially to build up the oscillatory motion of the yaw cradle member 4 and thereafter to sustain such oscillatory motion.

In order to provide the "pitch" motion about axis 48 at right angles to axis 6, a pitch table or cradle member 49 is provided having its side edges 51 and 52 pivotally connected to the yaw table 4 by means of trunnion bearings 53 mounted in suitable frame members 54 secured respectively to the side edges 11 and 12 of the yaw table 4. The pitch table 49 is thus free to oscillate about the axis 48 in a plane perpendicular to the plane of the base 3.

Referring now additionally to FIG. 3, in order to provide the oscillatory pitch motion, a pair of transversely spaced apart bracket members 55 and 56 extend downwardly from end 50 of the pitch table 49 with torsion tube assembly 57 extending therebetween and being fixedly secured thereto. More particularly, torsion tube assembly 57 comprises a pair of aligned outer torsion tubes 58, 59 having their outer ends respectively fixedly connected to the bracket members 55, 56 and having their inner adjacent ends respectively fixedly connected to a hub member 61. Disposed within the outer torsion tubes 58, 59 are inner torsion tubes 62 and 63, likewise having their inner adjacent ends fixedly secured to the hub member 61. The inner torsion tubes 62 and 63 respectively extend outwardly beyond the outer torsion tubes 58 and 59, having their extension portions 64 and 65 respectively journaled in suitable bearings 66 and 67 in the bracket members 55 and 56, lever members 68 and 69 being respectively fixedly secured thereto. Lever members 68 and 69 are in turn connected to the yaw table 4 by means of suitable links 70 and 71 and brackets 72 and 73. It will now be readily seen that each pair of inner and outer torsion tubes, i.e., 62, 58 and 63, 59 in essence form a "folded" torsion tube system. It will thus be readily seen that downward movement of pitch table 49 about axis 48 in the direction shown by the arrow 74 results in twisting of the torsion tubes 62, 58 and 63, 59 in one direction whereas upward movement of pitch table 49 in the direction opposite from arrow 74 results in twisting of the torsion tube assembly in the opposite direction.

In order to aid or augment the energy stored in the pitch torsion tube system 57, an inner torque shaft 75 is provided extending within the inner torsion tube 62 and having its end 76 fixedly connected to the hub 61. The other end 77 of torque shaft 75 extends outwardly beyond the inner torsion tube 64, being journaled in a suitable bearing 78 in lever member 68. Lever member 79 is fixedly secured to the end of extension 77 of torque shaft 75 and is actuated by connecting rod 81 of hydraulic cylinder 82 mounted on pitch table 49. It will thus be seen that outward thrust provided by the hydraulic cylinder 82 on the lever member 79 results in contribution of a substantial twist to the torque shaft 75, which by virtue of its small stiffness by comparison with the torsion tubes 62, 58 results in imparting a slight twist to the torsion tubes. As will be hereinafter more fully described, this added twist is appropriately timed so that it augments or aids the stored energy in the torsion tubes, thereby initially to build up the oscillatory pitch motion and to sustain the same at a predetermined amplitude.

It is again desirable that a balanced torsion spring system be provided for the pitch table 49, and to that end, a pair of bracket members identical to the bracket members 55 and 56 are provided at the other end 83 of the pitch table 49, only one such bracket member 84 being shown. A torsion tube assembly 85 identical to the torsion tube assembly 57 extends between the bracket members at end 83 of the pitch table 49 with lever members corresponding to lever members 68 and 69 being connected to the inner torsion tubes corresponding to 62 and 63; only one such inner torsion tube 86 and lever member 87 appears in FIG. 1. These lever members corresponding to lever members 68 and 69 are likewise pivotally secured to the yaw table 4. The inner torque shaft of the torsion tube assembly 57 corresponding to torque shaft 75 has a lever member corresponding to lever member 79 secured thereto, such lever member being diametrically opposite from lever member 79 and being adjustably secured to the pitch table 49 by means of a turnbuckle in the manner of the securement of lever member 46 to base 3 in the case of the yaw table torsion spring assembly.

In order to provide the roll motion about axis 88 mutually at right angles to the axes 48 and 6, a pair of bearing members 89 and 90 are provided respectively extending upwardly from ends 50 and 83 of the pitch table 49. A pair of cradle members 92 and 93 are provided respectively rotatably mounted in the bearing members 89 and 90, as by means of suitable roller bearings 94. Cradle members 92 and 93 are in turn adapted to support the object 2 which may be a pilotless aircraft or missile, by means of suitable clamping means (not shown). The cradle members 92 and 93 are rigidly interconnected for simultaneous movement by means of connecting frame members 95 and 96 having a central bulkhead member 97 secured thereto.

Referring now additionally to FIG. 4, in order to provide the roll oscillatory motion, a pair of aligned torsion tubes 98 and 99 are provided respectively having their adjacent ends fixedly secured to opposite sides of bulkhead member 97 and having their outer ends 101 and 102 respectively journaled in suitable bearings 103 and 104 in the cradle members 92 and 93. A pair of lever members 105 and 106 are provided respectively fixedly secured to ends 101 and 102 of the torsion tubes 98 and 99, lever member 105 being connected to connecting rod 107 of hydraulic cylinder 108 pivotally mounted on bearing member 89, and lever member 106 being adjustably secured to pitch table 49 by means of turnbuckle 111. It will thus be seen that the roll torsion tube assembly comprises two halves 98, 99 extending each way from the center bulkhead 97, both of which are twisted by virtue of the restraint applied to levers 106 and 105 by the anchor turnbuckle 111 and the connecting rod 107, respectively. In addition, the twist applied to the torsion tube-half 98 may be augmented by actuating hydraulic cylinder 108, such twisting resulting in rotational motion of the cradle members 92, 93 about axis 88 in the bearing members 89 and 90. Again, as will be hereinafter more fully described, the additional twisting effected by the hydraulic cylinder 108 is appropriately timed in order to augment the energy stored in torsion tubes 98 and 99 in order initially to build up the oscillatory roll motion and thereafter to sustain the same.

In order to fully understand the timing of the application of the additional forces to the torsion spring systems associated respectively with the yaw, pitch and roll cradles 4, 49 and 92, 93, reference is now made to FIG. 6. Here, sinusoidal curve 112 shows the desired sinusoidal motion of any one of the three cradle assemblies 4, 49 and 92, 93; it will be readily understood that the oscillatory motions of each cradle assembly are essentially identical except for amplitude. Curve 113, which it will be observed is 180° out of phase with the position curve 112, shows the force which is developed in the torsion tube spring systems due to the basic position 112 of the respective cradle assembly. Curve 114, indicated in broken lines, shows typical windage and friction losses due to motion of the particular cradle assembly and internal friction of the torsion tube itself. It will here be noted that the friction and windage forces reverse direction at times 115 and 116 when the direction of motion of the respective cradle assembly changes. Curve 117, which is equal and opposite to the friction and windage curve 114 thus shows the force required exactly to balance or offset the windage and friction losses and curve 118 shows the additional amount of force or twist of the torsion tube springs required to produce such offsetting force. Curve 119 thus shows the total torsional force, or the sum of the main oscillatory force plus the additional force or twist for overcoming friction and windage losses and curve 121 shows the velocity of the oscillating mass of the particular cradle assembly as related to its position. It is again to be noted that the instant in time at which the velocity of the mass goes through zero, i.e., where it stops and reverses direction, is coincident with the instant at which the frictional and windage forces reverse direction.

It will now be seen that the added force or twist should be applied at approximately the points in the oscillatory cycle where the mass of the particular cradle assembly reverses direction. It will further be seen that if at these points, more than sufficient force or twist is added to counterbalance frictional forces, the amplitude of the oscillatory motion will increase and conversely, if less than sufficient force or twist is applied to overcome the friction and windage losses, the oscillatory motion will be dampened.

A simple means for regulating the amplitude of the oscillatory motion of each cradle assembly is now suggested and reference is additionally made to FIGS. 5 and 7. Referring briefly to FIG. 5, in which the yaw table 4 is shown by way of example, sensing of the position of the table in its oscillatory motion 122 may readily be accomplished by means of a suitable linkage 123 converting the oscillatory motion 122 of yaw table 4 to oscillatory motion of a shaft 124 upon which suitable cams 125 and 126 are positioned. It will be readily understood that it may be desirable to interpose a mechanical motion amplifying arrangement between yaw table 4 and shaft 124, such mechanical amplifying arrangements being well known in the art and not requiring further description herein. As will be hereinafter more fully described, cam 125 is arranged to actuate contacts 127 in order to sense a predetermined amplitude of the oscillatory motion while cam 126 actuates contacts 128 in order to sense the neutral position of the yaw table 4. It will be readily understood that similar mechanical linkages may readily be employed in conjunction with the pitch table 49 and the roll cradle assembly 92, 93. Alternatively, or as a refinement, as shown in the case of the roll motion, as will be hereinafter more fully described, it may be desirable to provide additional cams 129 and 130 respectively actuating contacts 132 and 133, shown here in dashed lines. It will also be readily apparent that numerous other arrangements suggest themselves for sensing the desired positions of the three cradle assemblies 4, 49, 92, 93 and that this particular mechanical linkage shown in FIG. 5 does not form a part of my invention, other than in the overall combination.

Referring now additionally to FIG. 7 in which the preferred torsion tube twist reinforcing timing system of my invention is shown, contacts 128 actuated by cam 126 when yaw table 4 passes through its neutral or mid-position, i.e., when curve 112 passes through zero, are connected in series between a suitable timing motor 134 and a suitable source of energizing power 135 (not shown), a line switch 136 being interposed in series as shown. Connected across the cam actuated contacts 128 is another pair of contacts 137 actuated by cam 138 on shaft 139 driven by timing motor 134. The timing cam 138 is arranged so that immediately upon energization of timing motor 134 responsive to closing of contacts 128, cam 138 closes contacts 137 thereby disabling contacts 128 and maintaining timing motor 134 energized throughout substantially all of a complete oscillatory cycle of the particular cradle assembly.

A pair of cams 141 and 142 are also mounted on timing motor shaft 139 and respectively actuate contacts 143 and 144 connected in series with thrust and return operating coils 145 and 146 of four-way solenoid valve 147. The solenoid valve 147 is in turn connected to actuate the respective hydraulic cylinder 42, 82, or 108, as the case may be. Hydraulic fluid is supplied to the four-way solenoid valve 147 by a flow rate control valve 148 actuated by an operating coil 149 to provide either a low or a high hydraulic fluid flow rate to the four-way solenoid valve 147 and thus in turn to the respective hydraulic cylinder. Appropriate four-way solenoid valves and flow rate control valves are well known in the art and are commercially available and therefore need not be more fully described.

Following the passing of the particular cradle assembly through its zero position (curve 112), thus in turn closing contacts 128 to start timing motor 134, cam 141 will close its contacts 143 at time 151 in turn energizing operating coil 145 of four-way solenoid valve 147 from a suitable source of power 152 (not shown); cam 141 has a configuration so that contacts 143 are closed in the interval 151—153 thus actuating solenoid valve 147 in one direction, as shown in dashed lines 154. This in turn actuates the respective hydraulic cylinder 42, 82 or 108 as shown by the curve 155 and it will immediately be observed that the force applied by the cylinder, corresponding to its position 155, generally corresponds to curve 118 of FIG. 6, i.e., beginning approximately at the point where the direction of motion of the particular cradle assembly reverses.

Cam 142 in turn has a configuration such that contacts 144 are closed at time 156 and maintained closed until time 157 in order to energize the return operating coil 146 of solenoid valve 147 in order to apply return force twist 158 to the respective torsion tube assembly, again corresponding approximately to curve 118 of FIG. 6, i.e., at approximately the time at which the respective cradle assembly reverses its direction.

In order to permit initial build-up of the oscillatory motion and thereafter to sustain the desired amplitude of the oscillatory motion, cam 125 of the position sensing linkage 123 (FIG. 5) is arranged to close its contacts 127 responsive to a predetermined amplitude 159 of the oscillation of the particular cradle assembly. With contacts 127 open, i.e., below the predetermined amplitude 159, operating coil 149 of the flow rate control valve 148 is not energized from source of power (not shown) 161, and thus a high hydraulic fluid flow rate is supplied to the four-way solenoid valve 147 and the respective hydraulic cylinder, this high flow rate being sufficient to augment the stored energy of the torsion tube spring system in order to build up the amplitude of the oscillatory motion. When the maximum amplitude of the oscillatory motion reaches level 159, however, contacts 127 are closed by cam 125, thus energizing operating coil 165 of relay 166 from a suitable source of control power 167. Energizing of operating coil 165 closes normally open contacts 168 in series with normally closed contacts 169 actuated by cam 170 on shaft 139 driven by motor 134 and thus, operating coil 165 is sealed in until cam 170 opens contacts 169. Picking up of relay 166 also closes contacts 171 thus energizing operating coil 149 of the flow rate control valve 148 to reduce the hydraulic fluid flow rate to a lower value. Relay 166 remains sealed in through its sealing contacts 168 and thus operating coil 149 of flow rate control valve 148 remains energized until point 172 in the cycle of motion 122, at which point cam 170 opens contacts 169 thus deenergizing coil 165 of relay 166 in turn opening its sealing contacts 168 and contacts 171.

It will further be readily seen that as the amplitude of oscillation falls responsive to the lower flow rate, contacts 127 will not be caused to close and operating coil 149 will not be energized during any part of the cycle of motion so that the higher rate of flow of hydraulic fluid will remain impressed on the four-way solenoid valve 147 and the respective hydraulic cylinder.

It will be readily seen that the oscillatory motion of the apparatus thus far described may be stopped by phasing the application of hydraulic fluid to the hydraulic cylinders so that they oppose the energy stored in the torsion spring system. The energy in the mass-spring system is thus permitted to dissipate by forcing the hydraulic fluid out of the respective hydraulic cylinders. It will be readily apparent to one skilled in the art than an additional set of cams driven by motor 134 phased 180° from cams 141 and 142 will provide such deceleration and eventual stopping of the oscillatory motion.

It will now be seen that in accordance with my invention I have provided appropriate timing of the hydraulic cylinders which through their respective linkages apply additional force or twist to the torsion tube systems so that an initial twist is applied in one direction in order to initiate the oscillatory motion and at appropriate times thereafter, alternating forces or twists are applied in order to augment the energy stored in the torsion spring systems in order to build up the oscillatory motion and finally to sustain the same. In accordance with my invention, therefore, power is introduced by biasing the spring system at the correct phase relationship.

In the case of the roll motion, less inertia is involved and for this reason, additional contacts 132 and 133 actuated respectively by cams 129 and 130 responsive to motion of the respective cradle assembly are provided, contacts 132 and 133 being respectively connected in parallel with contacts 143 and 144 thereby to energize thrust and return coils 145 and 146 of the two-way solenoid valve 147. It is thus seen that with contacts 132 and 133 being respectively closed during intervals 162 and 163, after full amplitude oscillatory motion of the roll cradle 92, 93 has been obtained, the position contacts 132 and 133 effectively mask out the mode of control contacts 141 and 142 so that timing of the application of the additional thrust forces by hydraulic cylinder 108 is determined entirely by the roll cradle position rather than by the timing motor 134. It will be readily apparent that any of the three roll, pitch and yaw motions of the apparatus of FIG. 1 may be imparted to the object 2 independently or simultaneously. In the case of the application of only one of the notions, for example, the pitch motion about axis 48, the yaw table 4 would be suitably locked to the base 3 and the roll cradle 92, 93 would likewise be suitably locked to the pitch table 49. Likewise, for independent application of either of the other motions, the two cradle assemblies other than the effective one are locked together.

While the specific construction shown in the drawing finds particular utility as an exerciser for pilotless aircraft and missiles, as explained hereinabove, it will be readily apparent that the principles involved can be readily applied to any apparatus in which it is desired to exercise or impart a vibratory or oscillatory type motion to a massive object; the vibration of a railroad car in order to discharge its contents immediately suggests itself.

While I have described above the principles of my invention in connection with specific apparatus, it is to be clearly understood that this description is made only by way of example and not as a limitation to the scope of my invention.

What is claimed is:

1. Apparatus for imparting to an object oscillatory motion about three axes respectively at right angles to each other comprising: first means for supporting said object; second means for pivotally supporting said first means for oscillatory motion about a first of said axes; third means for pivotally supporting said second means for oscillatory motion about a second of said axes; fourth means for pivotally supporting said third means for oscillatory motion about the third of said axes; first spring means interconnecting said first and second means; second spring means interconnecting said second and third means; third spring means interconnecting said third and fourth means; and power means respectively operatively connected to each of said spring means for adding power thereto thereby overcoming losses in said second, third and fourth means and all of said spring means whereby said oscillatory motions are initiated and thereafter sustained.

2. Apparatus for imparting oscillatory motion about an axis to an object comprising: first means for supporting said object; second means for pivotally supporting said first means intermediate its ends for oscillatory motion about said axis; an elongated torsion spring; linkage connecting each end of said spring to opposite ends of said first means, each end of said spring being rotatably connected to said second means whereby swinging of said first means in each direction alternately twists said spring in opposite directions; lever means operatively connected to said spring for twisting the same; and reciprocating power means mounted on one of said first and second means and operatively connected to said lever means whereby twist is added to said spring thereby overcoming losses in said second means and said spring whereby oscillation of said first means is initiated and thereafter sustained.

3. Apparatus for imparting oscillatory motion about an axis to an object comprising: first means for supporting said object; second means for pivotally supporting said first means intermediate its ends for oscillatory motion about said axis; an elongated torsion tube; linkage connecting each end of said tube to opposite ends of said first means, each end of said tube being rotatably secured to said second means whereby swinging of said first means in each direction alternately twists said tube in opposite directions; an elongated torque shaft disposed within said tube and having one end secured to one end of said tube and its other end extending out of the other end of said tube; lever means operatively connected to said other end of said shaft for twisting the same and thereby applying a torque to augment that of said tube; and reciprocating power means mounted on one of said first and second means and operatively connected to said lever means whereby torque is added to that of said tube thereby overcoming losses in said second means and said tube whereby oscillation of said first means is initiated and thereafter sustained.

4. The combination of claim 3 further comprising another elongated torsion tube; linkage connecting each end of said other tube to opposite ends of said first means, each end of said other tube being rotatably secured to said second means whereby swinging of said first means in each direction alternately twists said other tube in opposite directions; said first-named and other torsion tubes forming a balanced torsion spring system whereby oscillatory motion is imparted to said first means; another elongated torque shaft disposed within said other tube and having one end secured to the end of said other tube corresponding to the other end of said first-named tube and having its other end extending out of the other end of said other tube; and another lever means operatively connected to said other end of said other shaft, said other lever means being secured to one of said first and second means.

5. Apparatus for imparting oscillatory motion about an axis to an object comprising: an elongated frame member adapted to have said object secured thereto; a supporting base member; means pivotally connecting said frame member intermediate its ends to said base member for oscillatory motion about said axis in a plane parallel with the plane of said base member; a pair of transversely spaced elongated torsion tubes respectively extending generally parallel to said frame member in its mid-position; a first pair of lever members respectively having one end pivotally connected to one end of said frame member adjacent its longitudinal center line, said first pair of lever members having their other ends respectively connected to one end of said torsion tubes; a second pair of lever members respectively having one end pivotally connected to the other end of said frame member adjacent its longitudinal center line, said second pair of lever members having their other ends respectively connected to the other ends of said torsion tubes; each of said torsion tubes being rotatably secured to said base member whereby swinging of said frame member in each direction about said axis alternately twists said tubes in opposite directions; a pair of elongated torque shafts respectively disposed within said tubes, each of said torque shafts having one end secured to an end of its respective torsion tube and its other end extending out of the other end thereof, said other ends of said torque shafts extending in opposite directions, a pair of lever members connected respectively to said other ends of said torque shafts; and reciprocating power means mounted on said base member and operatively connected to one of said last-named lever members for twisting the respective torque shaft and its respective torsion tube whereby twist is added thereto, thereby overcoming losses in said apparatus whereby oscillation of said frame member is initiated and thereafter sustained, the other of said last-named lever members being connected to said base member.

6. Apparatus for imparting oscillatory motion about an axis to an object comprising: first means for supporting said object; second means for pivotally supporting said first means intermediate its ends for oscillatory motion about said axis; means including a torsion tube; linkage connecting the ends of said tube respectively to one end of said first means and to said second means whereby swinging of said first means in each direction about said axis alternately twists said tube in opposite directions; an elongated torque shaft disposed within said tube and having one end secured thereto and its other end extending out of said tube, said shaft having less stiffness than said tube; lever means operatively connected to said other end of said shaft for twisting the same and thereby twisting said tube; and reciprocating power means mounted on one of said first and second means and operatively connected to said lever means whereby torque is added to that of said tube thereby overcoming losses in said second means and said tube whereby oscillation of said first means is initiated and thereafter sustained.

7. Apparatus for imparting oscillatory motion about an axis to an object comprising: first means for supporting said object; second means for pivotally supporting said first means intermediate its ends for oscillatory motion about said axis; a first pair of aligned torsion tubes respectively having adjacent ends joined by a hub portion, the other ends of said torsion tubes being respectively connected to opposite sides of one end of said first means; a second pair of torsion tubes respectively disposed within said first pair of tubes respectively having one end connected to said hub and their other ends respectively extending out of the other ends of said first torsion tubes; linkage respectively connecting said other ends of said second torsion tubes to said second means whereby swinging of said first means in each direction about said axis alternately twists said tubes in opposite directions; a torque shaft disposed within one of said second pair of tubes having one end connected to said hub and its other end extending out of the other end of said one of said second pair of tubes; lever means operatively connected to said other end of said shaft for twisting the same and thereby twisting said tubes; and reciprocating power means mounted on one of said first and second means and operatively connected to said lever means whereby twist is added to said tubes thereby overcoming losses in said apparatus whereby oscillation of said first means is initiated and thereafter sustained.

8. The combination of claim 7 further comprising: a third pair of aligned torsion tubes respectively having adjacent ends joined by another hub portion, the other ends of said third torsion tubes being respectively connected to opposite sides of the other end of said first means; a fourth pair of torsion tubes respectively disposed within said third pair of tubes respectively having one end connected to said hub and their other ends respectively extending out of the other ends of said third torsion tubes; linkage respectively connecting said other ends of said fourth torsion tubes to said second means; said first and second, and said third and fourth torsion tubes forming a balanced torsion spring system whereby oscillatory motion is imparted to said first means; another torque shaft disposed within the one of said fourth pair of tubes which is opposite from said one of said second pair of tubes and having one end connected to said other hub portion and its other end extending out of the other end of said one of said fourth pair of tubes; and another lever means operatively connected to said other end of said other shaft, said other lever means being secured to one of said first and second means.

9. Apparatus for imparting oscillatory motion about an axis to an object comprising: an elongated frame member adapted to have said object secured thereto; a supporting base member; means for pivotally connecting the sides of said frame member intermediate the ends thereof to said base member whereby said frame member may oscillate about said axis in a plane perpendicular to the plane of said base member; first and second pairs of respectively aligned outer torsion tubes, each said first and second pair of torsion tubes having adjacent ends joined by a hub portion, the other ends of said outer torsion tubes being respectively connected to opposite sides of opposite ends of said frame member; third and fourth pairs of inner torsion tubes respectively disposed within said outer torsion tubes, each of said inner torsion tubes having one end secured to the respective hub portion and its other end extending out of the other end of the respective outer torsion tubes; each of said other ends of said inner torsion tubes having a first lever connected thereto, said first levers being pivotally connected to said base member whereby swinging of said frame member about said axis in each direction alternately twists said torsion tubes in opposite directions; a pair of torque shafts respectively disposed within opposite ones of said third and fourth torsion tubes, said torque shafts respectively having one end connected to a respective hub portion and their other ends extending out of the respective inner tube; said torque shafts having less stiffness than said torsion tubes, second levers respectively connected to said other ends of said torque shafts; and reciprocating power means mounted on said frame member and operatively connected to one of said second levers whereby the respective torque shaft is twisted thereby adding twist to its associated torsion tubes whereby losses in said apparatus are overcome so that said oscillatory motion of said frame is initiated and thereafter sustained, the other of said second levers being connected to said frame member.

10. Apparatus for imparting oscillatory motion to an elongated object about its axis comprising: first means including spaced means for supporting said object; second means for pivotally supporting said first means for oscillatory motion about said axis; an elongated torsion tube having one end rotatably secured to one of said spaced means and having its other end fixedly secured to another part of said first means; lever means operatively connected to said one tube end; and reciprocating power means mounted on one of said first and second means and operatively connected to said lever means for twisting said tube whereby oscillation of said first means is initiated and thereafter sustained.

11. Apparatus for imparting oscillatory motion to an elongated object about its axis comprising: first means for supporting said object including spaced supporting means and means interconnecting said spaced means; second means for pivotally supporting said spaced means for oscillatory motion about said axis; a pair of aligned torsion tubes respectively having one end rotatably secured to said spaced means and their adjacent ends fixedly secured to a part of said interconnecting means; a pair of lever means respectively connected to said one ends of said tubes, one of said lever means being connected to said second means and reciprocating power means mounted on said second means and operatively connected to the other of said lever means for twisting said tubes whereby oscillation of said first means is iniated and thereafter sustained.

12. Apparatus for imparting oscillatory motion to an elongated object about its axis comprising: a cradle comprising a pair of spaced clamp members adapted to have said object secured therein, elongated frame elements interconnecting said clamp members, and a member connected to said frame elements intermediate said clamp members; a base member; means on said base member for respectively rotatably supporting said clamp members whereby said cradle may oscillate about said axis with said axis being parallel with the major axis of said base member; a pair of aligned torsion tubes extending respectively between said clamp members and said intermediate member, said tubes respectively having one end rotatably secured to said clamp members and their other ends fixedly connected to said intermediate member; a pair of lever members respectively connected to said one ends of said tubes, one of said lever members being connected to said base member; and reciprocating power means pivotally mounted on said base member and operatively connected to the other of said lever members for twisting said tube whereby oscillation of said cradle is initiated and thereafter maintained.

13. Apparatus for imparting oscillatory motion to an object comprising: first means for supporting said object; second means for supporting said first means for oscillatory motion about a neutral position; third means including spring means interconnecting said first and second means; power means operatively connected to one of said means for adding power to said spring means thereby overcoming losses in said means whereby oscillation of said first means is sustained; means for sensing passage of said first means through its neutral position; and means responsive to said sensing means for actuating said power means after a predetermined time delay.

14. Apparatus for imparting oscillatory motion to an object comprising: first means for supporting said object; second means for supporting said first means for oscillatory motion about a neutral position; third means including spring means interconnecting said first and second means; power means operatively connected to one of said means for adding power to said spring means thereby overcoming losses in said means whereby oscillation of said first means is sustained; means for sensing passage of said first means through its neutral position; timing means actuated by said sensing means for initiating a timing period substantially less than one full cycle of oscillation of said first means; means actuated by aid timing means after a first predetermined time delay approximately coinciding with the time at which said first means first changes direction for actuating said power means in one direction; and means actuated by said timing means after a second predetermined time delay approximately coinciding with the time at which said first means next changes direction for actuating said power means in the opposite direction thereby augmenting the energy stored in said spring means.

15. Apparatus for imparting oscillatory motion to an object comprising: first means for supporting said object; second means for supporting said first means for oscillatory motion about a neutral position; third means including spring means interconnecting said first and second means; power means operatively connected to one of said means for adding power to said spring means thereby overcoming losses in said means whereby oscillation of said first means is sustained; first contact means arranged to be actuated responsive to said first means passing through its neutral position; a timer connected in circuit with said first contact means whereby a timing cycle is initiated by a first actuation of said first contacts; means connected in circuit with said timer for overriding the next successive actuation of said first contacts and for providing a timing cycle substantially coextensive with a full cycle of said oscillatory motion of said first means; said power means being operable in two directions; second contact means actuated by said timer a predetermined time after initiation of a first half cycle of said oscillation approximately coinciding with the first reversal of direction of said first means and connected to actuate said power means in one direction; and third contact means actuated by said timer a predetermined time after initiation of the next successive half-cycle of said oscillation and approximately coinciding with the next reversal of direction of said first means and connected to actuate said power means in the opposite direction thereby to augment the energy stored in said spring means.

16. Apparatus for imparting oscillatory motion to an object comprising: first means for supporting said object; second means for supporting said first means for oscillatory motion about a neutral position; third means including spring means interconnecting said first and second means; power means operatively connected to one of said means for adding power to said spring means thereby overcoming losses in said means whereby oscillation of said first means is sustained; means for sensing passage of said first means through its neutral position; means responsive to said sensing means for actuating said power means after a predetermined time delay; said power means being arranged selectively to provide lower and upper power levels; and means for sensing the amplitude of said oscillation of said first means, said amplitude sensing means being coupled to said power means whereby the same provides said upper power level below a predetermined amplitude and said lower power level above said predetermined amplitude.

17. Apparatus for imparting oscillatory motion to an object comprising: first means for supporting said object; second means for supporting said first means for oscillatory motion about neutral position; third means including spring means interconnecting said first and second means; power means operatively connected to one of said means for adding power to said spring means thereby overcoming losses in said means whereby oscillation of said first means is sustained; first contact means arranged to be actuated responsive to said first means passing through its zero position; a timer connected in circuit with said first contact means whereby a timing cycle is initiated by a first actuation of said first contact means; means connected in circuit with said timer for overriding the next successive actuation of said first contact means and for providing a timing cycle substantially coextensive with a full cycle of said oscillatory motion of said first means; said power means being operable in two directions; second contact means actuated by said timer a predetermined time after initiation of a first half cycle of said oscillation approximately coinciding with the first reversal of direction of said first means and connected to actuate said power means in one direction; third contact means actuated by said timer a predetermined time after initiation of the next successive half-cycle of said oscillation and approximately coinciding with the next reversal of direction of said first means and connected to actuate said power means in the opposite direction thereby to augment the energy stored in said spring means; selectively variable control means connected to said power means whereby the same provides lower and upper power levels; and fourth contact means arranged to be actuated responsive to a predetermined maximum amplitude of said oscillation, said fourth contact means being coupled to said control means and actuating the same whereby said power means provides said upper power level below said predetermined maximum amplitude and said lower power level above said predetermined maximum amplitude.

18. Apparatus for imparting oscillatory motion to an object comprising: first means for supporting said object; second means for supporting said first means for oscillatory motion about a neutral position; third means including spring means interconnecting said first and second means; power means operatively connected to one of said means for adding power to said spring means thereby overcoming losses in said means whereby oscillation of said first means is sustained; fourth means for sensing passage of said first means through its neutral position; time delay means responsive to said sensing means for actuating said power means after a predetermined time delay thereby augmenting the energy stored in said spring means; and fifth means for sensing passage of said first means through a predetermined position of each half-cycle, said fifth means being connected to override said time delay means.

19. Apparatus for imparting oscillatory motion about an axis to an object comprising: first means for supporting said object; second means for pivotally supporting said first means for oscillatory motion about a neutral position about said axis; third means including a torsion spring interconnecting said first and second means whereby swinging of said first means in each direction alternately twists said spring in opposite directions thereby imparting oscillatory motion to said first means; a hydraulic cylinder mounted on one of said first and second means and operable to provide power thrust in both directions; lever means connecting said cylinder and said spring for adding twist thereto thereby overcoming losses in said second means and said spring whereby oscillation of said first means is initiated and thereafter sustained; first contacts operably connected to be actuated responsive to passage of said first means through its neutral position; a timer motor coupled for energization responsive to actuation of said first contacts; means coupled in circuit with said timer motor for overriding said first contacts and for providing a cycle of operation for said timer motor substantially coextensive with one full cycle of oscillation of said first means; a two-way solenoid valve connected to said hydraulic cylinder for selectively actuating the same in each direction, said valve having first and second operating coils; second contacts actuated by said timer motor a predetermined time after start of said timer motor cycle and connected to energize one of said valve coils thereby to actuate said cylinder in one direction at a time approximately coincident with the first reversal of direction of said first means; and third contacts actuated by said timer motor a predetermined time after actuation of said second contacts and connected to energize the other of said valve coils thereby to actuate said cylinder in the opposite direction at a time approximately coincident with the next reversal of direction of said first means whereby energy stored in said torsion tube is augmented.

20. Apparatus for imparting oscillatory motion about an axis to an object comprising: first means for supporting said object; second means for pivotally supporting first means for oscillatory motion about a neutral position about said axis; third means including a torsion spring interconnecting said first and second means whereby swinging of said first means in each direction alternately twists said spring in opposite directions thereby imparting oscillatory motion to said first means; a hydraulic cylinder mounted on one of said first and second means and operable to provide power thrust in both directions; lever means connecting said cylinder and said spring for adding twist thereto thereby overcoming losses in said second means and said spring whereby oscillation of said first means is initiated and thereafter sustained; first contacts operably connected to be actuated responsive to passage of said first means through its neutral position; a timer motor coupled for energization responsive to actuation of said first contacts, means coupled in circuit with said timer motor for overriding said first contacts and for providing a cycle of operation for said timer motor substantially coextensive with one full cycle of oscillation of said first means; a four-way solenoid valve connected to said hydraulic cylinder for selectively actuating the same in each direction, said valve having first and second operating coils; second contacts actuated by said timer motor a predetermined time after start of said timer motor cycle and connected to energize one of said valve coils thereby to actuate said cylinder in one direction at a time approximately coincident with the first reversal of direction of said first means; third contacts actuated by said timer motor a predetermined time after actuation of said second contacts and connected to energize the other of said valve coils thereby to actuate said cylinder in the opposite direction at a time approximately coincident with the next reversal of direction of said first means whereby energy stored in said torsion tube is augmented; hydraulic fluid flow rate control valve means connected with said solenoid valve for providing upper and lower hydraulic fluid flow rates thereto; and fourth contacts actuated responsive to a predetermined maximum amplitude of said oscillation of said first means, said fourth contacts being connected to said flow rate control means thereby to provide said upper flow rate below said predetermined amplitude and said lower flow rate above said predetermined amplitude whereby said oscillation is initially built up and thereafter sustained at said predetermined amplitude.

21. Apparatus for imparting oscillatory motion about an axis to an object comprising: first means for supporting said object; second means for pivotally supporting said first means for oscillatory motion about a neutral position about said axis; third means including a torsion spring interconnecting said first and second means whereby swinging of said fist means in each direction alternately twists said spring in opposite directions thereby imparting oscillatory motion to said first means; a hydraulic cylinder mounted on one of said first and second means and operable to provide power thrust in both directions; lever means connecting said cylinder and said spring for adding twist thereto thereby overcoming losses in said second means and said spring whereby oscillation of said first means is initiated and thereafter sustained; first contacts operably connected to be actuated responsive to passage of said first means through its neutral position; a timer motor coupled for energization responsive to actuation of said first contacts; means coupled in circuit with said timer motor for overriding said first contacts and for providing a cycle of operation for said timer motor substantially coextensive with one full cycle of oscillation of said first means; a four-way solenoid valve connected to said hydraulic cylinder for selectively actuating the same in each direction, said valve having first and second operating coils; second contacts actuated by said timer motor a predetermined time after start of said timer motor cycle and connected to energize one of said valve coils thereby to actuate said cylinder in one direction at a time approximately coincident with the first reversal of direction of said first means; third contacts actuated by said timer motor a predetermined time after actuation of said second contacts and connected to energize the other of said valve coils thereby to actuate said cylinder in the opposite direction at a time approximately coincident with the next reversal of direction of said first means whereby energy stored in said torsion tube is augmented; and fourth and fifth contacts respectively actuated responsive to passage of said first means through a predetermined part of the first and second half-cycles of oscillation thereof, said fourth and fifth contacts respectively closing earlier and opening later than said second and third contacts, said fourth and fifth contacts being respectively connected to said first and second valve coils and overriding said second and third contacts except during initial build-up of said oscillating motion.

22. Apparatus for imparting oscillatory motion to an object comprising: first means for supporting said object; second means for supporting said first means for oscillatory motion about a neutral position; third means including spring means interconnecting said first and second means; power means operatively connected to one of said means for adding power to said spring means thereby overcoming losses in said means whereby oscillation of said first means is sustained; means for sensing passage of said first means through its neutral position; timing means actuated by said sensing means for initiating a timing period substantially less than one full cycle of oscillation of said first means; means for selectively augmenting the energy stored in said spring means comprising means actuated by said timing means after a first predetermined time delay approximately coinciding with the time at which said first means first changes direction for actuating said power means in a first direction, means actuated by said timing means after a second predetermined time delay approximately coinciding with the time at which said first means next changes direction for actuating said power means in a second direction opposite from said first direction; and means for selectively stopping said oscillatory motion comprising means actuated by said timing means for reversing the phasing of actuation of said power means thereby opposing the energy stored in said spring means.

References Cited in the file of this patent
UNITED STATES PATENTS

| | | |
|---|---|---|
| 1,904,169 | Reutter | Apr. 18, 1933 |
| 2,238,116 | Kelly | Apr. 15, 1941 |
| 2,470,773 | Haskins | May 24, 1949 |
| 2,697,343 | Hirtreiter | Dec. 31, 1954 |
| 2,844,777 | Ross | July 22, 1958 |

UNITED STATES PATENT OFFICE
CERTIFICATE OF CORRECTION

Patent No. 3,031,878                      May 1, 1962

Ralph C. Welch

It is hereby certified that error appears in the above numbered patent requiring correction and that the said Letters Patent should read as corrected below.

Column 15, line 25, after "supporting" insert -- said --; column 16, line 1, for "fist" read -- first --.

Signed and sealed this 11th day of September 1962.

(SEAL)
Attest:

ERNEST W. SWIDER
Attesting Officer

DAVID L. LADD
Commissioner of Patents